United States Patent Office 3,199,362
Patented Aug. 10, 1965

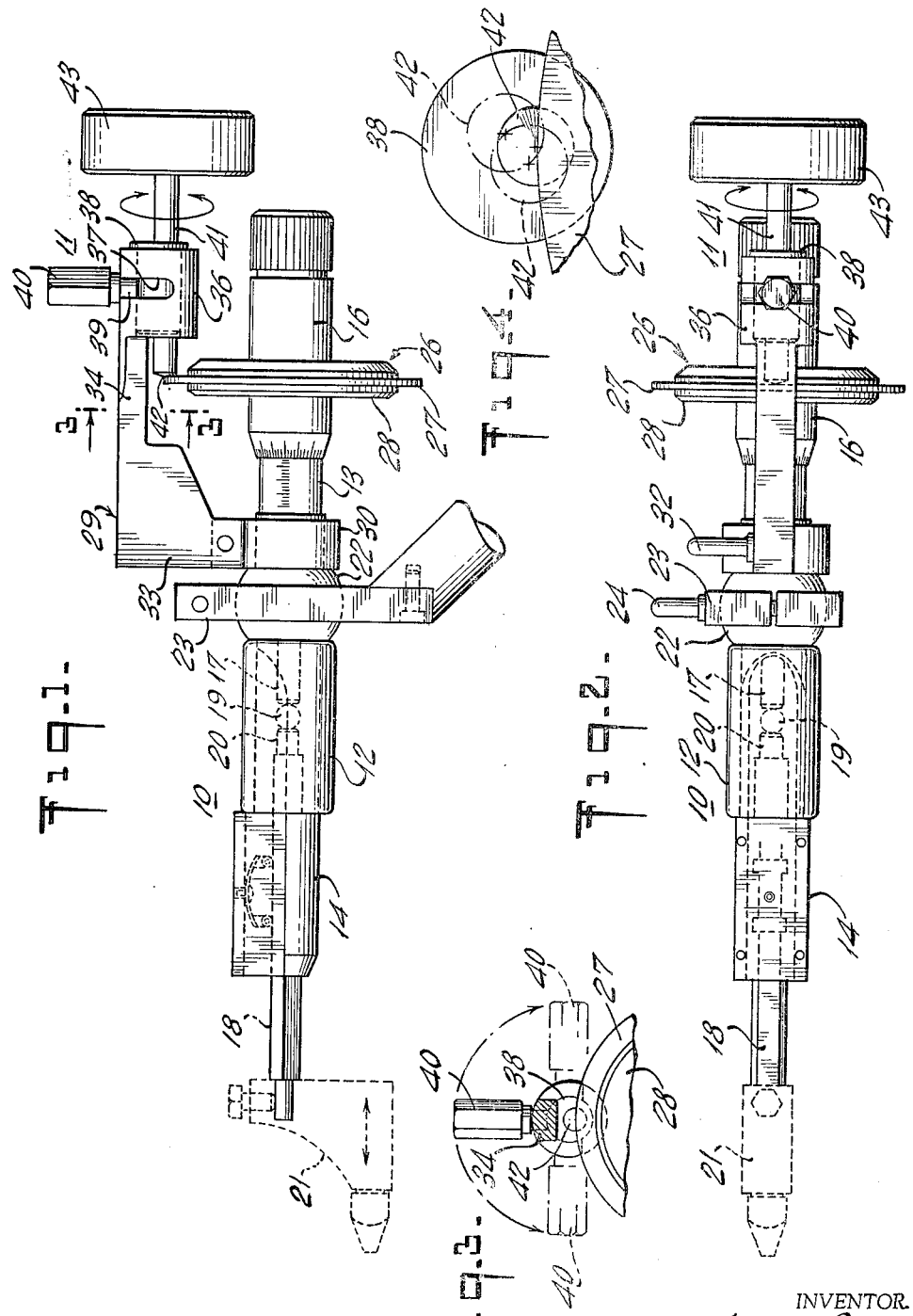

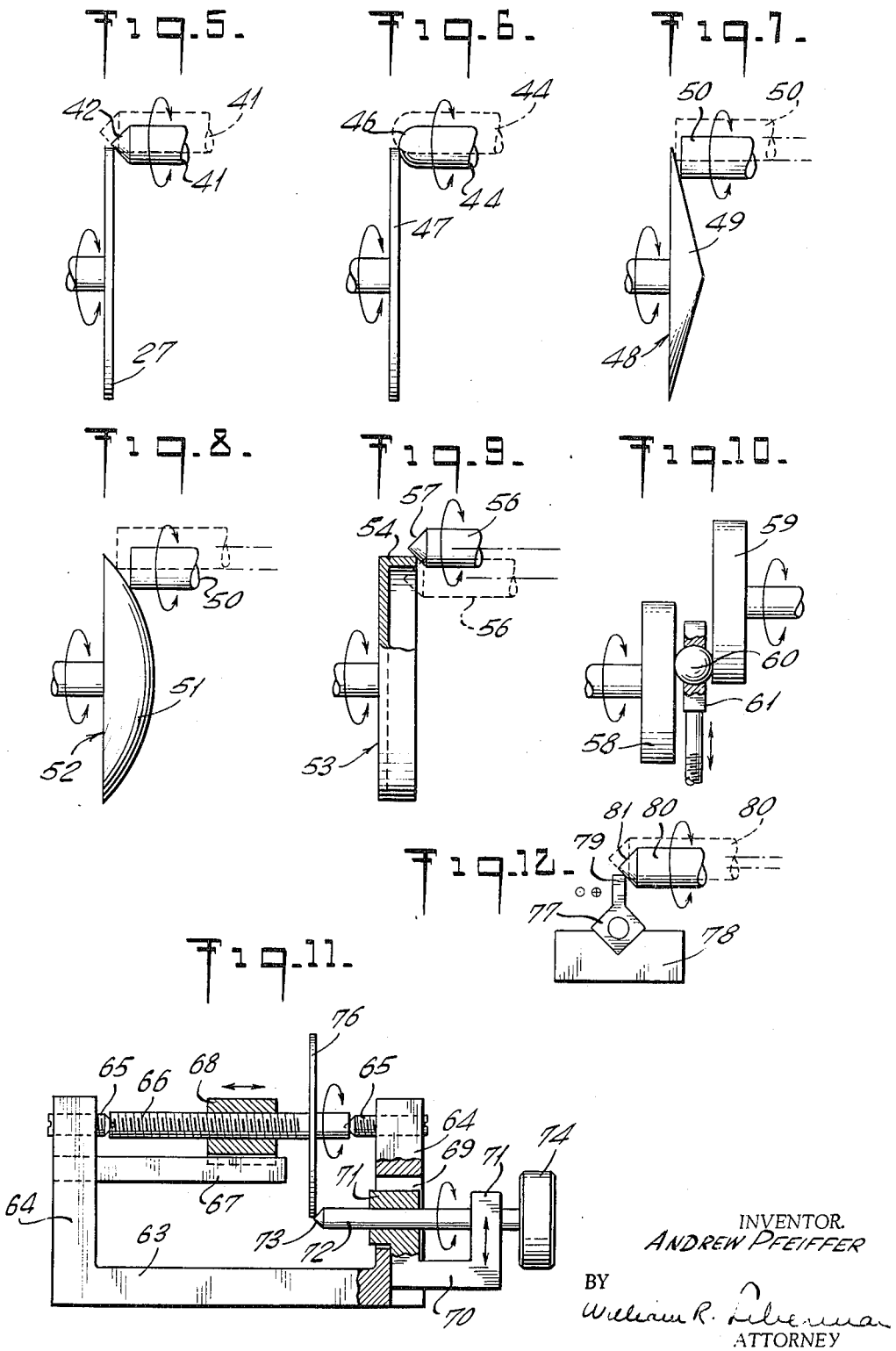

3,199,362
MAGNETIC VARIABLE SPEED DRIVE
Andrew Pfeiffer, P.O. Box 450, R.F.D. 1,
Old Lyme, Conn.
Filed Nov. 14, 1963, Ser. No. 323,684
13 Claims. (Cl. 74—210)

The present invention relates generally to improvements in motion-transmission mechanisms. It relates, in particular, to an improved variable, speed-reducing mechanism in which extremely high reduction ratios are attainable and which is highly useful as a drive for micromanipulators and the like devices.

Many procedures require an extremely fine adjustments of the position of a tool, implement or the like wherein undesirable variations or movements, or excessive adjustments or hunting is detrimental to the associated procedure. Thus, in the exploration of the brain attendant medical diagnosis, treatment and the like, it is a common procedure to employ a probe or electrode for sensing and stimultaing selected closely delineated areas of the exposed brain. It is an absolute requisite that the position of the probe or electrode be under the complete control of the operator and that fine positive adjustments in the position thereof be available in the absence of hunting or uncontrolled movements. In the exploration of the brain, any improper handling of the probe or electrode may result in serious and irreparable damage. A micromanipulator which has proven highly satisfactory in fine work as typified by brain exploration is described in U.S. Patent No. 2,891,416, granted June 23, 1959, to Andrew Pfeiffer. The aforesaid micromanipulator must, however, be controlled at times with extreme care since there is only one adjustment ratio available and this ratio is frequetnly not fine enough for use under certain conditions.

It is, therefore, a principal object of the present invention to provide an improved motion-transmisison apparatus.

Another object of the present invention is to provide an improved speed-reducing mechanism.

Still another object of the present invention is to provide an improved continuously variable speed-reducing mechanism.

A further object of the present invention is to provide an improved variable speed-reducing mechanism in which extremely high reduction ratios are attainable.

Still a further object of the present invention is to provide an improved variable speed-reducing mechanism in which backlash and discontinuities in motion are obviated.

Another object of the present invention is to provide an improved speed-reducing mechanism of the above nature and a micromanipulator employing such mechanism characterized by simplicity of construction and operation, ruggedness, versatility and reliability in use.

The above and further objects of the present invention will become apparent from a reading of the following description, taking in conjunction with the accompanying drawings, wherein FIGURE 1 is a front elevational view of an improved micromanipulator embodying the present invention, the probe chuck being illustrated by broken line;

FIGURE 2 is a top plan view thereof;

FIGURE 3 is a sectional view taken along line 3—3 in FIGURE 1 illustrated by broken line in different drive ratio positions;

FIGURE 4 is a fragmentary schematic end view of the speed reducing mechanism, illustrated by broken line in different drive ratio positions;

FIGURE 5 is a front view of the speed reducing mechanism drive and driven elements, the drive element being shown by broken line in a low speed reduction ratio position and by full line in a high speed reduction ratio position;

FIGURE 6 is a view similar to FIGURE 5, of another embodiment of the present invention;

FIGURE 7 is a view similar to FIGURE 5 of still another embodiment of the present invention;

FIGURE 8 is a view similar to FIGURE 5 of a further embodiment of the present invention;

FIGURE 9 is a view similar to FIGURE 5 of still a further embodiment of the present invention;

FIGURE 10 is a view similar to FIGURE 5 of another embodiment of the present invention;

FIGURE 11 is a front fragmentary view of the improved speed reducing mechanism applied to another form of motion translating device; and FIGURE 12 is a schematic end fragmentary view of another form of variable speed motion translation mechanism embodying the present invention.

In a sense, the present invention contemplates the provision of a motion-transmission device comprising a drive member rotatable about a first axis, and a driven member rotatable about a second axis offset relative to said first axis, said first and second members having peripheral paths magnetically urged into tangential contact in an area offset relative to said first and second axes.

According to a preferred form of the improved mechanism, one of the motion-transmitting members has a tapered end face, which may be conical as one example thereof, and the other motion-transmitting member is provided with a peripheral edge in tangential contact with the tapered end face and maintained in such contact by a magnetic field. Both motion-transmitting members are formed for a magnetic material and advantageously at least one of them is a permanent magnet to establish said magnetic field, although such magnetic field may be otherwise established. The motion-transmitting members are relatively axially movable and are relatively transversely adjustable to bring selected sections of the tapered end face into engagement with the peripheral edge and thereby vary the speed transmission ratio. The resulting speed reducing mechanism is advantageously employed with a micromanipulator in which the driven member is mounted on the rotatable control member of the micromanipulator.

Referring now to the drawings, and more particularly to FIGURES 1 to 5 thereof, illustrating a preferred embodiment of the present invention, reference numeral 10 generally designates a manipulator controlled by means of the improved variable speed reducing mechanism 11. Manipulator 10 is of the type and construction described in detail in the above-identified Pfeiffer patent and includes a main frame 12 supporting a rearwardly directed barrel 13 and a forwardly directed cradle 14. A thimble 16 defining the manipulator control member rotatably engages barrel 13 and carries an axial spindle threaded at its rear section and engaging a tapped bore formed in the barrel 13 and terminating in a forwardly directed cylindrical shank 17. A spindle 18 is slidably supported by cradle 14 and is coupled to the leading end of shank 17 by a ball 19 of magnetic material, magnetically maintained in contact with the shank and spindle by a permanent magnet 20 forming the trailing end of spindle 18. A tool or implement-holding chuck 21 is affixed to the leading end of spindle 18. Thus, rotation of the thimble 16 effects longitudinal movement of the spindle 18 and the extent of such movement can be determined from scale markings 22 on the barrel 13 and thimble 16.

In order to permit the support and angular adjustment of manipulator 10, frame 12 is provided with an enlarged spherical section 22 which is engaged between jaws 23 of a clamp member, jaws 23 having confronting concave spherical surfaces releasably engaging the spherical section 22. Jaws 23 are supported in any suitable manner and may be selectively compressed or expanded by a thumb screw 24 engaging the free ends of the jaws.

The variable speed-reducing mechanism 11 comprises a driven member 26 which includes a flat disc 27 formed of a magnetic material, such as iron or steel. Disc 27 is concentrically mounted on thimble 16 and is affixed thereto by a pair of opposing circular plates 28 secured to thimble 16 and tightly sandwiching disc 27.

A bracket 29 is mounted on frame 13 and includes a clamping collar 30 engaging the frame rearwardly of spherical section 22 and tightened by a thumb screw 32. A leg 33 projects upwardly from collar 30 and terminates in a rearwardly directed support arm 34 extending beyond disc 27.

Mounted on and depending from the free end of arm 34 at a point rearwardly of disc 27 is a longitudinally extending sleeve member 36 whose axis is a short distance above the upper edge of disc 27. A peripheral groove 37 is formed in the upper half of sleeve 36 and a journal bushing 38 rotatably nests in the sleeve 36 and has an eccentric axial bore formed therein. A pin 39 projects radially from bushing 38 into sliding engagement with sleeve slot 37 and terminates in a threaded shank engaged by a thumb nut 40 which releasably engages the outer wall of the sleeve. Thus, the transverse relationship of the eccentric axial bore in bushing 38 and the edge of the disc 27 may be selectively adjusted by loosening the thumb nut 40, swinging it to rotate the bushing 38 to a selected position and then tightening the nut.

The drive member comprises a cylindrical rod or spindle 40 slidably and rotatably registering with the eccentric axial bore in bushing 38 and projecting beyond the opposite ends thereof. Spindle 41 is a permanent magnet and has an end face 42 which engages the peripheral edges of the disc 27 and is maintained in tangential contact therewith by reason of the magnet attraction between spindle 41 and disc 27. While spindle 41 may be formed of a permanent magnet material, it may be formed of a shell of magnetic material not necessarily permanently magnetized and may house a suitably oriented permanent magnet to define a permanent magnet spindle. Moreover, the magnetic field which maintains the driven and drive members 27 and 41 in engagement may be established in other manners than employing a permanent magnet drive member. For example, the driven member may be a permanent magnet either with or in place of the drive member, or other magnetic arrangements, either electromagnets, or preferably permanent magnets, may be employed to induce a magnetic field which effects the attraction between the drive and driven members to maintain them in rolling tangential contact. A control wheel or knob 43 is concentrically affixed to the free end of the spindle 41 to facilitate the rotation thereof.

Considering the operation of the device described above, when the device is in the position illustrated in the drawings, journal bushing 38 is in a position which supports the drive spindle 41 in its innermost position radially relative to disc 27, so that the section of the end face of the spindle close to the apex thereof or the axis of the spindle 41 engages the peripheral edge of the disc 27. The peripheral edge of the disc and the conical end face 42 of the spindle are maintained in rolling tangential contact by reason of the magnetic attraction therebetween. By rotating spindle 41 by means of wheel 43, disc 27 is rotated at a much slower speed, the speed reduction ratio being equal to the ratio of the diameter of the disc 27 to the diameter of the section of the end face 42 in engagement therewith. Since this ratio can be extremely high, a correspondingly fine adjustment of the manipulator is effected because minute controllable rotation of thimble 16 can be produced. It should be noted that, as thimble 16 is rotated and moved axially, disc 27 is correspondingly moved and followed by the freely axially movable spindle 41 which is magnetically attracted thereto.

In order to reduce the speed-reduction ratio and hence effect a coarser adjustment, it is merely necessary to loosen the thumbs nut 40 and swing it from its upright position an amount corresponding to the desired speed reduction ratio and then tighten nut 40. With the swinging of nut 40, bushing 38 is rotated correspondingly to move spindle 41 radially outwardly relative to disc 27 and bring larger diameter sections of the conical end face 42 in engagement with the outer edge of the edge. As a result, a smaller speed reduction ratio and hence a coarser manipulator control is effected. During the transverse adjustment of the spindle, the magnetic field maintains the drive and driven members in frictional engagement.

The end face of the drive spindle may be of any tapered configuration. For example, in FIGURE 6 of the drawings, the drive spindle 44 has an arcuate end face 46 which is coaxial with the spindle 44 and engages the periphery of the associated driven disc 47. The operation and manipulation of the aforesaid arrangement is similar to that first described.

The embodiments of the present invention illustrated in FIGURES 7 and 8 of the drawing differ from those earlier described in that the driven member is provided with a tapered end face which is engaged by the peripheral leading edge of the drive spindle. Referring to FIGURE 7, the driven member 48 is in the form of a rotatable disc having a coaxial conical end face. The drive spindle 50 has a flat leading end face whose circular peripheral edge is magnetically maintained in frictional contact therewith in the manner earlier described. The speed ratios between the drive and driven members 50 and 48 is varied by adjusting the transverse distance between the drive and driven member axes, the smaller the distance between these axes the smaller the speed reduction ratio and when such distance is less than the diameter of the spindle end face the ratio is less than 1 and there is an increase in the speed transmission. The speed reduction ratio is equal to the ratio of the radius of the end face of the spindle to the distance between the point of contact thereof with the disc end face 48 and the axis of the driven member 48.

The embodiment illustrated in FIGURE 8 differs from that of FIGURE 7 only in that the end face 51 of the driven member 52 is arcuate instead of conical. In all other respects, these two embodiments are similar.

In FIGURE 9 of the drawings, there is illustrated another embodiment of the present invention in which the speed reduction mechanism is not only adjustable to different speed rotios but also to different direction relationships, that is, of forward or reverse drive. Specifically, the driven member 53 is in the form of a rotatable wheel having a rearwardly directed axially extending peripheral flange 54 of a magnetic material. The drive member is in the form of a permanent magnet cylindrical spindle 56 having a forwardly directed, conical end face 57 supported and magnetically maintained in tangential frictional contact with the free edge of the peripheral flange in the manner earlier described. The spindle 56 is transversely adjustable relative to the drive member 53, as above set forth, not only to vary the speed reduction ratio but the direction of rotation as well. Thus, when the apex of the conical end face 57 of the spindle is located outwardly of the flange 54, as shown in the drawing by full lines, the drive and driven members rotate in opposite directions and the speed reduction ratio increases with decreases in the transverse distance between the axes of the drive and driven members and the consequent engagement of the flange 54 by sections of the conical end face 57 of spindle 56 of smaller diameters. On the other hand, when the apex of the spindle and face 57 is disposed inwardly of the flange 54, as illustrated by the broken lines in the drawing, the drive and driven members rotate in the same direction and the speed reduction ratio decreases with decreases in the transverse distance between the axes of the drive and driven members.

Referring now to FIGURE 10 of the drawings, which illustrates a further form of speed varying mechanism embodying the present invention, the drive and driven members are defined by a pair of discs 58 and 59 having longitudinally spaced confronting parallel end faces and rotatable about parallel eccentric axes. The discs 58 and 59 are formed of magnetic material and at least one of them is a permanent magnet, the inner end face being a pole of the magnet. Where both discs are permanent magnets, the confronting faces of discs 58 and 59 are opposite magnetic poles. Sandwiched between and engaging the confronting faces of the discs 58 and 59 is a spherical roller 60 formed of magnetic material. Discs 58 and 59 are relatively axially movable so as magnetically to maintain roller 60 and the end faces of discs 58 and 59 in successive rolling frictional engagement. Roller 60 freely rotatably registers in an aperture formed in a plate 61 which is transversely adjustable in any suitable manner correspondingly to adjust the position of the roller 60.

The speed transmission ratio between the driving member 59 and the driven member 58 depends on the position of the roller 60 relative to the axes of rotation of these members. The ratio of the speeds of member 59 to member 58 is equal to ratio of the radial distances of center of roller 60 to the axis of member 59 and to the axis of member 58. Thus, the arrangement shown in FIGURE 10 may be employed as a speed-increasing as well as a speed-reducing transmission mechanism.

In FIGURE 11, of the drawing, there is shown another form of motion-translating device employing the present speed-reducing mechanism. There is provided a base member 63 including a pair of opposite upright arms 64 carrying at their upper ends conically tipped coaxial bearing pins 65 extending toward each other. A screw member 66 has conical wells formed in its end faces which are engaged by the bearing pins 65 to rotatably support screw 66 freely. Mounted on one of the base arms 64 and extending below and parallel to the screw 66 is a track 67. A follower member 68 is slidable along the track 67 and is restricted thereby to a longitudinal movement and has a threaded bore formed therein engaging screw 66. The other arm 64 has a vertical slot 69 formed therein which engages a bracket 70 which is vertically adjustable therein in any suitable manner. Bracket 70 is provided with a pair of upright legs 71 having a pair of longitudinally aligned bores formed therein, one of the legs 71 registering with slot 69. A rotatable drive spindle 72 slidably registers with the aligned bores in the legs 71 and terminates at its inner end in a conical face 73. Spindle 72 is a permanent magnet and has a finger wheel 74 affixed to its outer end. A disc 76 of magnetic material is concentrically affixed to screw 66 and its peripheral edge engages the end face 73 of the spindle. As in the previously described embodiments, the end face 73 is magnetically maintained in frictional tangential contact with the peripheral edge of disc 76 and the speed-reduction ratio of spindle 72 to disc 76 is varied by adjusting the inter-axial distance of the spindle and disc. With rotation of the spindle by means of wheel 74, disc 76 and screw 66 are rotated to effect the longitudinal movement of follower 68.

A fine linear motion may be achieved without the use of a screw or the like by the system illustrated in FIGURE 12 of the drawings. Specifically, a plate 77 of square transverse cross-section rests in and is slidable along a track 78 having a mating longitudinal groove formed therein. An upstanding flange 79 of magnetic material is disposed along the length of plate 77. A rotatable spindle 80 is a permanent magnet and includes a conical end face 81 which engages the upper edge of flange 79. Spindle 80 is supported in the manner earlier described and is axially movable and transversely adjustable relative to flange 79 to bring sections of different diameters of the end face 81 into magnetically maintained tangential frictional contact with the edge of flange 79. The spindle 80 is provided with the usual finger wheel to permit the rotation thereof. The rate of advance of spindle 77 relative to the rotation of the spindle 80 depends on the diameter of the section of the conical end face 81 engaging flange 79, the smaller the diameter of this section the lesser the relative rate of advance of the spindle 77. It should be noted that the various modifications of the earlier described embodiments are correspondingly applicable to the present embodiment as well as to the other disclosed forms of the present device.

While there have been described and illustrated preferred embodiments of the present invention, it is apparent that numerous alterations, omissions and additions may be made without departing from the spirit thereof. For example, while the axes of rotation of the drive and driven members are illustrated as being parallel, they may be angularly related but are preferably coplanar.

I claim:

1. A motion-transmission device comprising a drive member formed of a magnetic material and rotatable about a first axis and having a circular section, a driven member formed of a magnetic material having a circular section and rotatable about a second axis offset relative to said first axis, at least one of said members being a permanent magnet whereby to urge said members into tangential contact along said circular sections at a point offset relative to said first and second axes, and means for adjusting the relative positions of said first and second members and the eccentricity of said point of tangential contact of said circular sections relative to at least one of said axes.

2. The device of claim 1 wherein said first and second members are longitudinally movable relative to each other.

3. A speed-reducing mechanism comprising a disc-shaped driven member rotatably supported about a first axis and formed of a magnetic material, a drive member rotatably supported about a second axis offset relative to said first axis and formed of magnetic material, said members being axially movable relative to each other and said drive member having a tapered end face magnetically maintained in tangential contact with the peripheral edge of said disc member, and means for adjusting the transverse spacing of said first and second axes to bring selected tansverse sections of said tapered face into engagement with said disc peripheral edge.

4. The mechanism of claim 3, wherein said drive member comprises a cylindrical rod formed of a permanent magnet 5. The mechanism of claim 3 comprising a micrometer member including a rotatable control element, said disc member being concentrically affixed to said control member.

6. A variable speed transmission mechanism comprising a first member formed of a magnetic material and rotatable about a first axis and having a tapered end face concentric with said first axis, a second member formed of a magnetic material and rotatable about a second axis offset relative to said first axis and having a peripheral edge concentric with said second axis and magnetically maintained in tangential contact with said tapered end face, said first and second members being axially movable relative to each other, and means for adjusting the transverse distance between said first and second axes to bring selected transverse sections of said tapered face into engagement with said disc peripheral edge.

7. The mechanism of claim 6, wherein at least one of said members is a permanent magnet.

8. The mechanism of claim 6, wherein said end face is of conical configuration.

9. The mechanism of claim 6 comprising a micrometer device including a rotatable control element, one of said members being concentrically affixed to said control element.

10. A speed-reducing mechanism comprising a disc-shaped driven member rotatably supported about a first axis and formed of a magnetic material and provided with a rearwardly directed peripheral flange, a drive member rotatably supported about a second axis offset relative to said first axis and formed of a magnetic material and having a forwardly directed tapered end face engaging the forward free edge of said peripheral flange, said members being axially movable relative to each other and said tapered end face being magnetically maintained in engagement with the free edge of said flange, and means for adjusting the transverse spacing of said first and second axes to bring selected transverse sections of said tapered face into engagement with said free edge of the flange.

11. A motion-transmission device comprising a driven member having an elongated edge, a rotatable drive member having a tapered end face engaging said edge and magnetically maintained in contact therewith, and means for transversely adjusting the position of said end face relative to said elongated edge to bring selected sections of said end face into engagement with said elongated edge.

12. A manipulating device comprising a rotatable axially movable control element, a disc member concentrically affixed to said control element, a cylindrical drive member having a tapered end face engaging the peripheral edge of said disc member and magnetically maintained in contact therewith and supported for axial and rotational movements, and means for adjusting the transverse position of said cylindrical member relative to said disc member to bring selected sections of said end face into registry with said disc member peripheral edge.

13. A motion translating mechanism comprising a rotatable screw, a follower engaging said screw, a disc member being concentrically affixed to said screw, a cylindrical drive member having a tapered end face engaging the peripheral edge of said disc member and magnetically maintained in contact therewith and supported for axial and rotational movements, and means for adjusting the transverse position of said cylindrical member relative to said disc member to bring selected sections of said end face into engagement with the peripheral edge of said disc member.

References Cited by the Examiner

UNITED STATES PATENTS

| | | | |
|---|---|---|---|
| 698,866 | 4/02 | Smith | 74—198 |
| 2,118,347 | 5/38 | Hardenberg | 74—198 X |
| 2,596,538 | 5/52 | Dicke | 74—198 X |
| 2,951,384 | 9/60 | Rouverol | 74—198 |

FOREIGN PATENTS

| | | |
|---|---|---|
| 1,212,177 | 10/59 | France. |
| 968,884 | 4/58 | Germany. |
| 526,878 | 1940 | Great Britain. |
| 623,173 | 1949 | Great Britain. |
| 455,813 | 3/50 | Italy. |

DON A. WAITE, *Primary Examiner.*